United States Patent
Jujjuri et al.

(10) Patent No.: US 10,158,642 B2
(45) Date of Patent: Dec. 18, 2018

(54) COHERENT DISTRIBUTED LOGGING

(71) Applicant: salesforce.com, inc., San Francisco, CA (US)

(72) Inventors: Venkateswararao Jujjuri, Beaverton, OR (US); Sameer Tiwari, Fremont, CA (US); James John Seeger, Jr., Portland, OR (US); Patrick James Helland, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 295 days.

(21) Appl. No.: 15/148,516

(22) Filed: May 6, 2016

(65) Prior Publication Data

US 2017/0322994 A1     Nov. 9, 2017

(51) Int. Cl.
   *H04L 29/06*     (2006.01)
   *H04L 29/08*     (2006.01)
   *G06F 17/30*     (2006.01)

(52) U.S. Cl.
   CPC ...... *H04L 63/102* (2013.01); *G06F 17/30575* (2013.01); *H04L 67/1095* (2013.01); *H04L 67/1097* (2013.01); *H04L 67/125* (2013.01); *H04L 67/42* (2013.01)

(58) Field of Classification Search
   CPC .............. H04L 67/1097; H04L 67/42; G06F 17/30581; G06F 11/3075
   See application file for complete search history.

(56) References Cited

U.S. PATENT DOCUMENTS

| | | | | |
|---|---|---|---|---|
| 8,862,541 | B1* | 10/2014 | Cox | H04L 67/1095 707/610 |
| 9,934,110 | B2* | 4/2018 | Brown | G06F 11/1469 |
| 2007/0186068 | A1* | 8/2007 | Agrawal | G06F 11/1456 711/162 |
| 2010/0049718 | A1* | 2/2010 | Aronovich | G06F 17/30115 707/607 |
| 2015/0242451 | A1* | 8/2015 | Bensberg | G06F 17/30578 707/615 |
| 2016/0301753 | A1* | 10/2016 | Auch | G06F 15/167 |

OTHER PUBLICATIONS

Chang et al., Bigtable: A Distributed Storage System for Structured Data, Google Inc., 14 pages. (Year: 2014).*
Lin et al., PacificA: Replication in Log-Based Distributed Storage Systems, 14 pages (Year: 2007).*
Cecchet et al., Middleware-based Database Replication—The Gaps Between Theory and Practice, 14 pages (Year: 2008).*

* cited by examiner

*Primary Examiner* — Hadi S Armouche
*Assistant Examiner* — Huan V Doan
(74) *Attorney, Agent, or Firm* — MORRIS & KAMLAY LLP

(57) ABSTRACT

Log entries are provided with unique entry identifiers, which may be sequenced in an incremental or decremental order, to create or to update a distributed log which may be replicated and distributed to multiple servers in a network. The entry identifiers may be appended to their respective log entries. Files, records or data which are identified by their respective log entries may be transmitted regardless of the sequence of the entry identifiers.

21 Claims, 6 Drawing Sheets

COHERENT DISTRIBUTED LOGGING

BACKGROUND

A log is an append-only sequence of records arranged in a given order, for example, in a chronological order. Such a log may be a simple abstraction of a sequence of records in a single server. However, the abstraction process for generating such a log may become complicated if the log is distributed across multiple servers. A log that is distributed across multiple servers in a network or multiple networks is typically called a distributed log. Multiple servers may accept write operations simultaneously or nearly simultaneously from a client who may be running multiple applications or processes concurrently on one or more client devices. Multiple replicas of the distributed log across multiple servers may be created when these servers accept multiple write operations.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter, and together with the detailed description, serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

As noted above, multiple replicas of a distributed log across multiple servers may be created when the servers accept multiple write operations. In a computer network with multiple servers, it may become difficult to maintain strictly coherent serialization with data consistency in a distributed log if the distributed log is replicated multiple times across multiple servers. A distributed logging system may be implemented to serialize write operations and to maintain strict ordering of log entries while writing replicas to maintain data consistency among the log records distributed to multiple servers. In conventional logging systems, strict serialization of write operations may need to be enforced to maintain coherency of distributed logs. Due to the need for strict serialization, it may be difficult or unfeasible to create or to update distributed logs with multiple threads or processes, thus resulting in increased latency and reduced bandwidth for write operations.

According to embodiments of disclosed subject matter, methods and apparatus are provided to facilitate out-of-order write operations with in-order responses which would allow distributed logging systems for multiple servers to maintain log consistency while offering high data throughputs, thereby allowing fast and efficient write operations for distributed logs. Client processes or applications may transmit entries out of order. Each of the entries is allocated a unique entry identifier (EntryID), thus allowing a distributed log to be organized based on a sequence of EntryIDs. For example, the distributed log may be organized based on sequential increments of EntryIDs. Alternatively, the distributed log may be organized based on another type of sequence, for example, based on sequential decrements of EntryIDs. The amount of latency or time delay in the creation of a distributed log may be reduced by allowing client applications or processes to transmit entries out of order, thus resulting in an increase in the speed or bandwidth of distributed logging over conventional techniques, such as strict serialization of write operations and strict maintenance of order in replicating the distributed log.

As used herein, a distributed log may be regarded as a log which is replicated or distributed across multiple servers, computers, or data processing systems in a network or across multiple networks. As used herein, a client may be regarded as any device, computer or system which may transmit log entries that correspond to certain files, records or sets of data. As used herein, a log entry may be an entry that identifies a file, a record, or a set of data associated with an individual customer or entity, or a file, a record, or a set of data associated with a class, group, or category of customers or entities, for example.

An application or a process that is run by the client to create one or more log entries may be regarded as a client application or a client process. An application may run more than one process. Two or more processes may be run on the same application or on different applications. A client library may include a function for allocating entries from multiple client applications or processes in an ordered manner. The client library and the client application or process may reside in the same client device or in different client devices. As used herein, a server may be regarded as any device, computer or system that is capable of storing a distributed log in a memory, such as a random access memory (RAM), or a storage device, such as a hard disk drive or a tape drive, for example.

Figure 1:
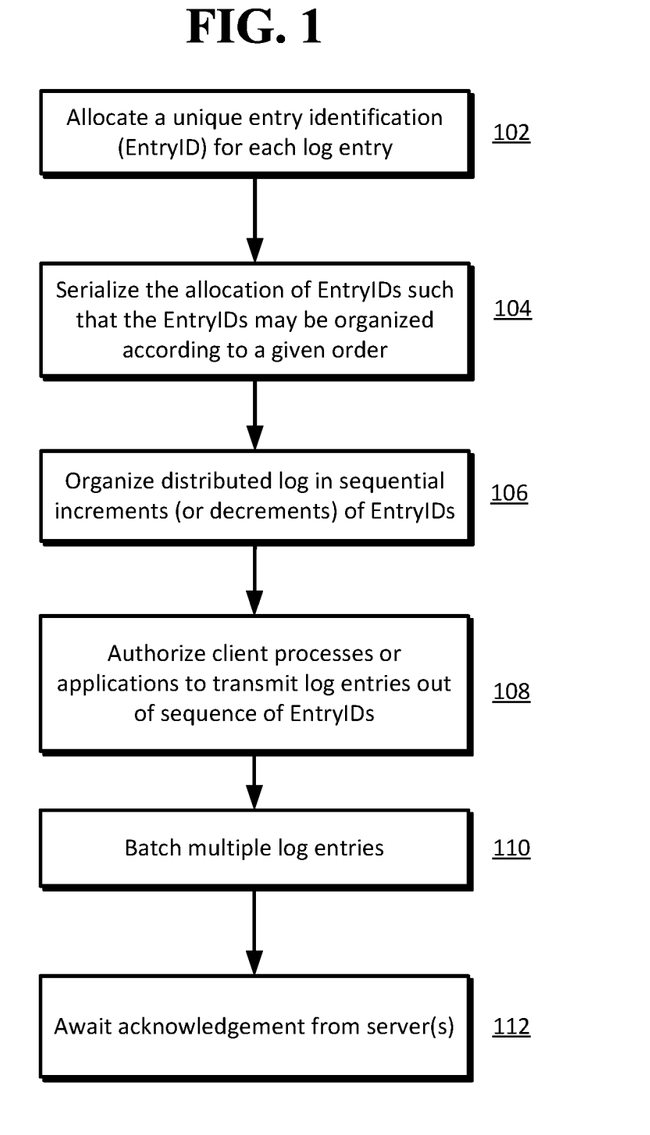
FIG. 1 shows a flowchart illustrating an example of a process of transmitting log entries by a client according to embodiments of the disclosed subject matter.

FIG. 1 shows a flowchart illustrating an example of a process of transmitting log entries by a client according to embodiments of the disclosed subject matter. A unique EntryID is allocated in block 102 for each log entry that corresponds to a given file, record, or set of data. In a network with multiple servers, a client may attempt to write multiple log entries through multiple client applications or processes to a distributed log. The client library may be configured to allocate EntryIDs serially, for example, as a sequence of numbers. Each EntryID uniquely identifies, within the system, a corresponding log entry that a client process is attempting to write to the distributed log.

The allocation of EntryIDs may be serialized in block 104 such that the EntryIDs are organized according to a given order. The EntryIDs may be allocated as numbers in sequential increments, and the distributed log is organized in sequential increments of EntryIDs, as shown in block 106. Alternatively, the EntryIDs may be allocated in a different order, for example, as numbers in sequential decrements.

The order in which the EntryIDs are allocated may or may not be based on the chronological order in which the log entries are to be transmitted. After the EntryIDs are allocated, each client process or application may be authorized to transmit files, records, or sets of data corresponding to the log entries without corresponding to the sequence or order in which the EntryIDs are assigned to the log entries, as shown in block 108. In some implementations, the client device in which the client library resides may authorize other client devices to transmit EntryIDs out of sequence by communicating the authorizations to other client devices directly or through the network.

In some implementations, EntryIDs may be assigned by a single entity, for example, the client library. Multiple applications or processes associated with the same client library may write log entries in parallel. For example, a client may possess multiple machines or terminals running multiple client applications or processes simultaneously or nearly simultaneously. The client library may reside in the same machine that runs one or more client applications or processes, or in a machine separate from the machines or terminals running the client applications or processes. In these implementations, the client library is the single entity that has the authority to allocate EntryIDs to various log entries created by various client applications or processes, thereby avoiding a conflict of EntryIDs. The following is a simplified example of EntryIDs generated by a client library for log entries generated by two client applications or processes at various times of entry. In a distributed logging system for a large database, a log entry may have more than three characters, and an EntryID may have more than two digits or characters.

Client Application/Process 1:

| Time of Entry | Log entry | EntryID | EntryID appended to tail |
|---|---|---|---|
| 1 | ABC | 45 | ABC45 |
| 2 | DEF | 48 | DEF48 |
| 3 | FGH | 50 | FGH50 |
| 4 | none | none | |
| 5 | JKL | 52 | JKL52 |

Client Application/Process 2:

| Time of Entry | Log entry | EntryID | EntryID appended to tail |
|---|---|---|---|
| 1 | XYZ | 46 | XYZ46 |
| 2 | WXY | 47 | WXY47 |
| 3 | UVW | 49 | UVW49 |
| 4 | RST | 51 | RST51 |
| 5 | QRS | 53 | QRS53 |

In the above example, the client library allocates a unique EntryID to each log entry created by each of the client applications or processes. In some implementations, no EntryID is allocated to a null entry, such as Time of Entry 4 by Client Application/Process 1 in the example above. In other implementations, an EntryID may be assigned to a null entry. As illustrated by the above example, for each client process or application, the EntryIDs may not correspond sequentially to the order in which the log entries are created. EntryIDs may be stored in association with log entries in any suitable manner. For example, the EntryID may be appended to the tail of the corresponding log entry to create an expanded log entry. Alternatively or in addition, a variable-sized log or table may be created by organizing log entries according to their EntryIDs, for example, by organizing log entries according to sequential increments of EntryIDs, sequential decrements of EntryIDs, or the like. Data, files or records may be identified by corresponding log entries in various manners, for example, by a byte range or an integer count.

Multiple log entries may be batched together in block 110 to improve the throughput of write operations. For example, multiple entries may be batched together on a client channel on which multiple client applications or processes transmit the log entries to one or more servers. As another example, multiple log entries may be batched together on a server channel on which one or more servers receive the entries from the client applications or processes in a distributed logging system. Each client process or application may wait for acknowledgement from one or more servers, as shown in block 112. The client may wait for acknowledgement from more than one server to ensure that the distributed log is created or updated successfully. For example, the client may wait for acknowledgement from all the servers in the network for a confirmation, or alternatively, at least a majority or at least a minimum number of servers in the network to return acknowledgements that the distributed log has been updated successfully with log entries transmitted from the client.

Figure 2:
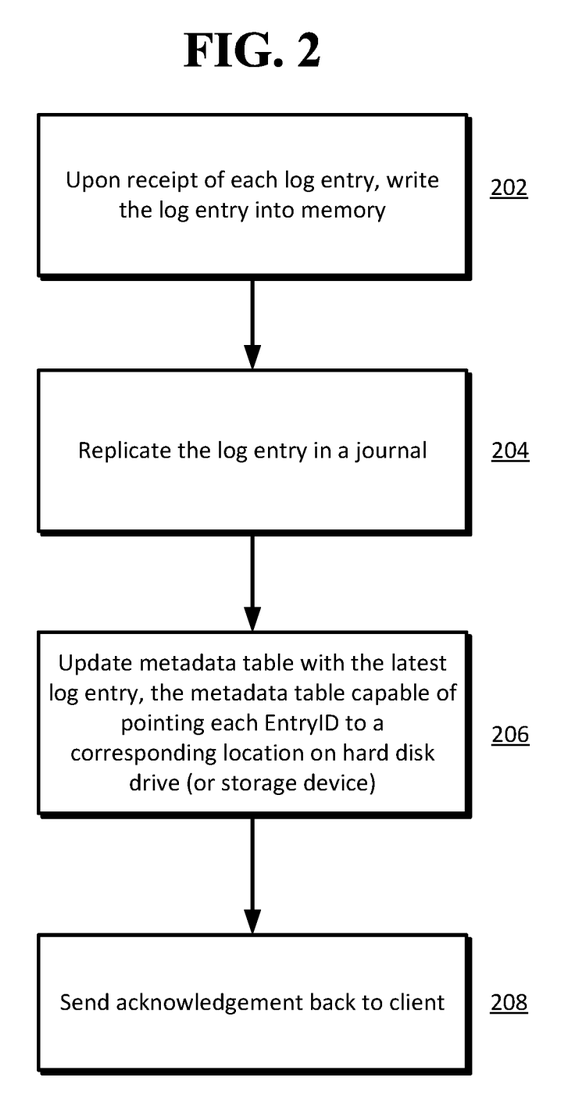
FIG. 2 shows a flowchart illustrating an example of a process of accepting log entries by a server according to embodiments of the disclosed subject matter.

FIG. 2 shows a flowchart illustrating an example of a process of accepting log entries by a server according to embodiments of the disclosed subject matter. Upon receipt of each log entry, the server may write the log entry into a memory in block 202, and may replicate the log entry in a journal, as shown in block 204. The server, which may include a hard disk drive or another type of storage device, may update a metadata table in the memory with the latest received log entry, as shown in block 206. The metadata table may be configured to point each EntryID to a corresponding physical location of the file, record, or set of data on the hard disk drive or storage device. In one implementation, the metadata table may include information that allows pointing of each EntryID to the corresponding payload or content on the hard disk drive or storage device. After the metadata table is updated with the latest received log entry, the server may send an acknowledgement or response back to the client that has transmitted the log entry with the associated EntryID, as shown in block 208.

Figure 3:
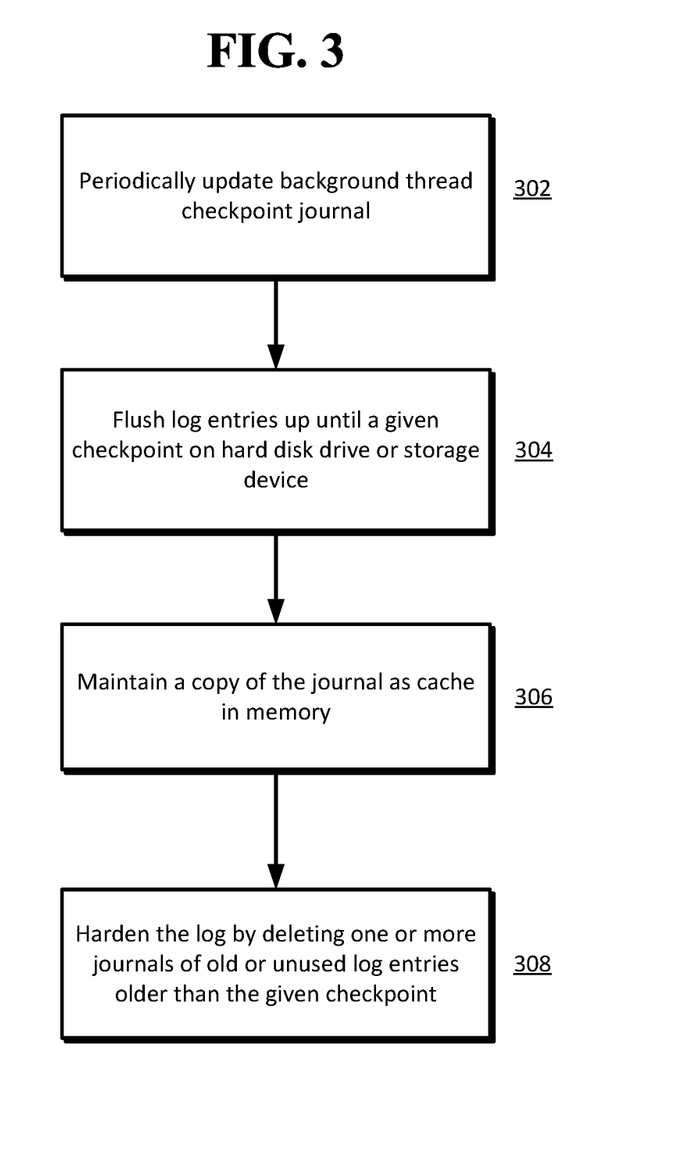
FIG. 3 shows a flowchart illustrating an example of a process of hardening of entries by the server according to embodiments of the disclosed subject matter.

FIG. 3 shows a flowchart illustrating an example of a process of hardening of entries by the server according to embodiments of the disclosed subject matter. An entry on a storage device, such as a hard disk, is considered to be "hardened" when it is guaranteed that the data will be available when the server responds to a request by a client application or some other application to access the data. The server may periodically update a background thread checkpoint journal as shown in block 302, and flushes the log entries up until a given checkpoint on a hard disk drive or storage device, as shown in block 304. A copy of the journal may be maintained as cache in a memory, as shown in block 306. The cache, which stores the copy of the journal, may be subject to memory management and cache pressures, because cache memory in a given server may not have unlimited capacity, and old or unused entries may need to be flushed from the cache memory from time to time. The server may harden the log by deleting one or more journals of old or unused log entries older than the given checkpoint, as shown in block 308.

Figure 4:
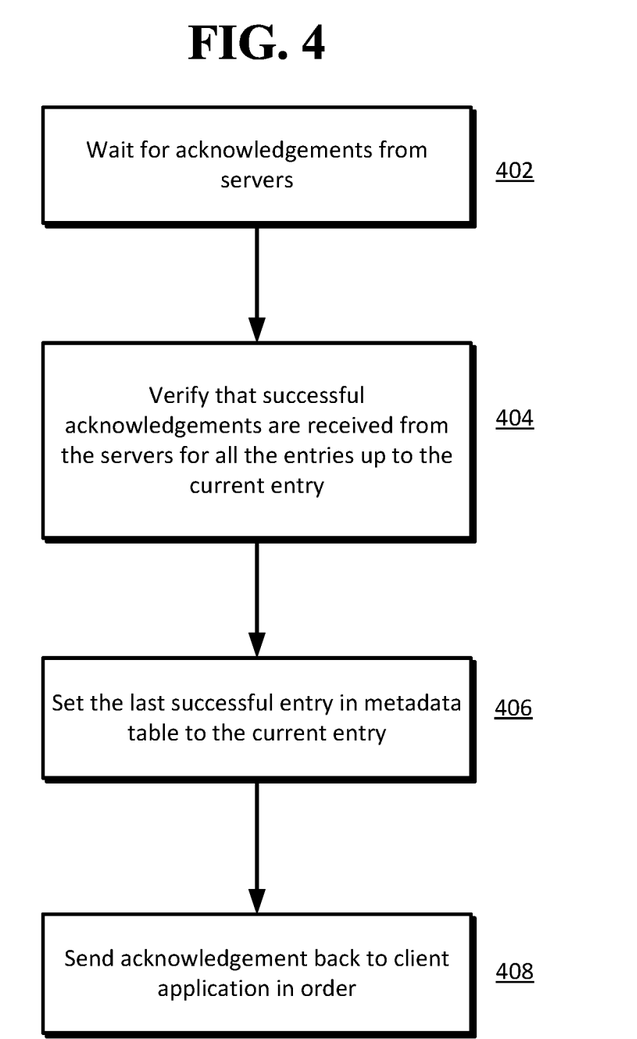
FIG. 4 shows a flowchart illustrating an example of a process of receiving an acknowledgement or response by the client according to embodiments of the disclosed subject matter.

FIG. 4 shows a flowchart illustrating an example of a process of receiving an acknowledgement or response by the client library according to embodiments of the disclosed subject matter. A client library may wait for acknowledgements or responses from one or more servers, as shown in block 402. For example, the client library may wait for acknowledgements from more than one server to ensure that the acknowledgements are valid in a distributed logging system. The client library may wait for acknowledgements from all servers, or alternatively, acknowledgements from at least a majority of servers or at least a minimum number of servers in the network. The client library may verify that successful acknowledgements are received from the servers for all the entries up to the current entry, as shown in block 404. In some implementations, even if the client applications may transmit EntryIDs out of order, the servers will transmit acknowledgements sequentially in the order of EntryIDs. The client library may set the last successful entry in the metadata table to the current entry, as shown in block 406. In an embodiment, the client library may send an acknowledgement back to the client application, as shown in block 408. Because the acknowledgements generated by the servers are in the order of EntryIDs even though the client applications may have transmitted EntryIDs out of order, the acknowledgements that are sent back to the client applications are also in the order of Entry IDs. In the specific example above, even if Client Application/Process 2 had transmitted EntryID 53 before Client Application/Process 1 transmitted EntryID 52, the servers would transmit acknowledgement of successful receipt of EntryID 53 after transmitting acknowledgement of successful receipt of Entry ID 52. Thus, the Client Application/Process 2 would receive acknowledgement of successful logging of EntryID 53 after Client Application/Process 1 receives acknowledgement of successful logging of EntryID 52.

The distributed logging system disclosed herein may be implemented as a multi-tenant system. The system may include a server that can generate one or more virtual applications based on data stored in a common database shared between the tenants. Each virtual application may provide access to data in the database for each of the one or more tenants utilizing the system. A tenant may refer to a group of users that shares access to common data within a database. A tenant may represent customers, customer departments, business or legal organizations, and/or any other entities that maintain data for particular sets of users. A tenant may, for example, request social media posts, metadata, and/or analytics provider data. Although multiple tenants may share access to a common server and database, the particular data and services provided from the system to each tenant can be securely isolated from those provided to other tenants. The multi-tenant architecture therefore allows different sets of users to share functionality without necessarily sharing their private data. Similarly, the appearance of the interface of each tenant with the system may be unique.

Figure 5:
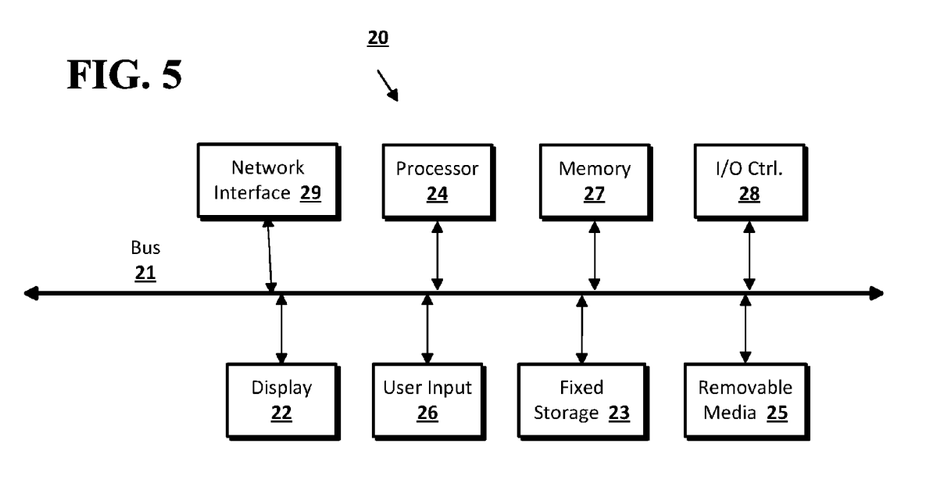
FIG. 5 shows an example of a computer according to an implementation of the disclosed subject matter.

Implementations of the presently disclosed subject matter may be implemented in and used with a variety of component and network architectures. FIG. 5 is an example of a computer 20 suitable for implementations of the presently disclosed subject matter. The example of the computer as shown in FIG. 5 may be implemented as a client device which may perform one or more processes of transmitting log entries as shown in FIG. 1 and described above, or one or more processes of receiving acknowledgements of successful log entries as shown in FIG. 4 and described above. The example of the computer as shown in FIG. 5 may also be implemented as a server which may perform one or more processes of receiving log entries from a client as shown in FIG. 2 and described above, or one or more processes of hardening log entries on the server as shown in FIG. 3 and described above.

As shown in FIG. 5, the computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fiber Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a wired or wireless telephone link, a cable link, an optical fiber link, a satellite link or the like, to the Internet via an Internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 6.

Many other devices or components (not shown) may be connected in a similar manner (e.g., document scanners, digital cameras and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, removable media 25, or on a remote storage location.

Figure 6:
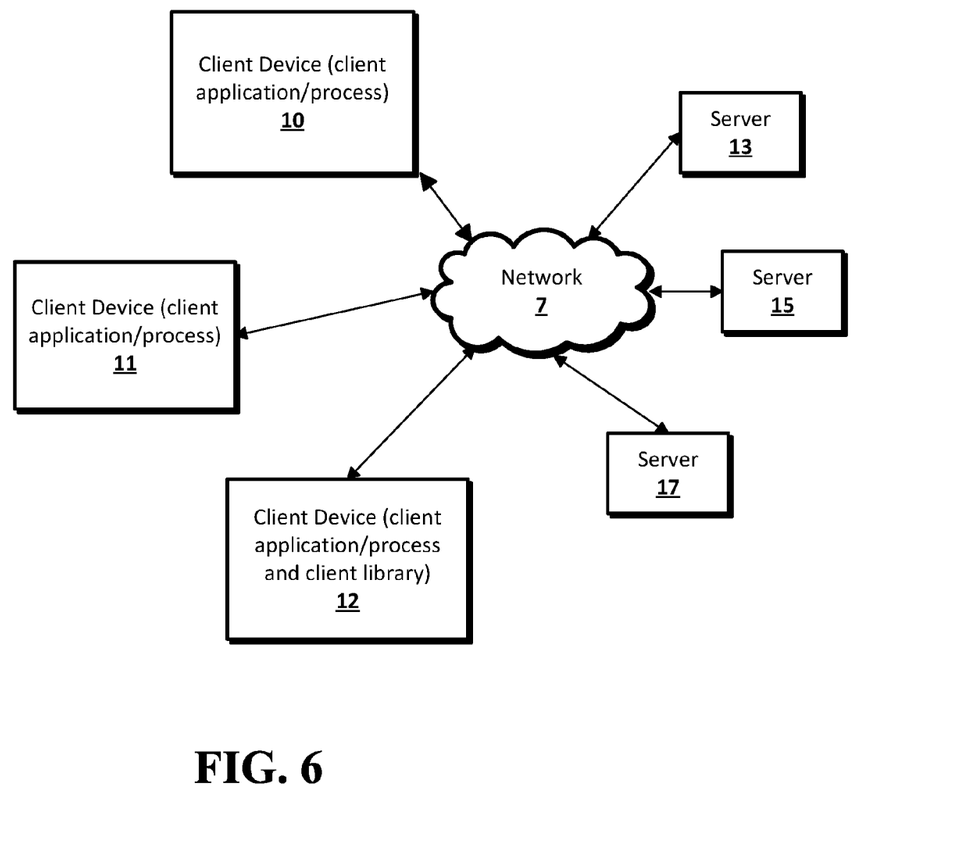
FIG. 6 shows an example of a network configuration according to an implementation of the disclosed subject matter.

FIG. 6 shows an example of a network arrangement according to an implementation of the disclosed subject matter. One or more client devices 10, 11 and 12, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The client devices may communicate with one or more servers 13, 15 and 17 through one or more networks 7. The client devices 10, 11 and 12 also may access remote platforms (not shown), such as cloud computing arrangements and services, through one or more networks 7. One or more of the client devices 10, 11 and 12 may include one or more client processes or applications that create one or more log entries as described above. One of the client devices, for example, client device 12 as shown in FIG. 6, may include a client library that allocates EntryIDs for log entries concurrently created by various client processes or applications and authorizes transmission of the log entries out of sequence of the EntryIDs by various client devices. One or more of the servers 13, 15 and 17 may perform one or more processes as shown in FIG. 2 for receiving log entries or one or more processes as shown in FIG. 3 for hardening of log entries, for example.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method of generating coherent log entries in a distributed log in a network comprising a plurality of servers and a plurality of client devices, wherein the client devices access a client library, the method comprising:
   allocating, by the client library, a first entry identifier corresponding to a first log entry of a plurality of log entries created by a first client process of a plurality of client processes, wherein the first client process runs on a first client device of the plurality of client devices;
   allocating, by the client library, a second entry identifier corresponding to a second log entry of the plurality of log entries created by a second client process of the plurality of client processes, wherein the second client process runs on a second client device of the plurality client devices concurrently with running of the first client process on the first client device, and wherein the second entry identifier is allocated subsequent to the first entry identifier being allocated;
   authorizing, by the client library, transmission of the first log entry by the first client device and the second log entry by the second client device to one or more of the plurality of servers in the network, wherein the authorizing comprises authorizing transmission of the second log entry prior to transmission of the first log entry;
   receiving, by the client library, acknowledgement of the first log entry and acknowledgement of the second log entry from one or more of the plurality of servers that replicate the first log entry and the second log entry in a journal that includes a background thread checkpoint, maintain a copy of the journal in cache memory, update the journal by flushing at least the first log entry and the second log entry up until a predetermined checkpoint, and delete one or more other journals older than the predetermined checkpoint; and
   transmitting, by the client library to the client devices, the acknowledgement of the second log entry subsequent to the acknowledgement of the first log entry.

2. The method of claim 1, wherein the first client device is the client device that includes the client library.

3. The method of claim 1, wherein the second client device is the client device that includes the client library.

4. The method of claim 1, wherein the first client device and the second client device are separate from the client device that includes the client library.

5. The method of claim 1, further comprising batching a plurality of log entries including the first log entry and the second log entry by one of the client devices.

6. The method of claim 1, further comprising:
   allocating, by the client library, a third entry identifier corresponding to a third log entry of the plurality of log entries created by a third client process of the plurality of client processes, wherein the third client process runs on a third client device of the plurality client devices concurrently with running of the first client process on the first client device and running of the second client process on the second client device, and wherein the third entry identifier is allocated subsequent to the second entry identifier being allocated;
   authorizing, by the client library, transmission of the third log entry by the third client device to one or more of the plurality of servers in the network prior to transmission of the first log entry;
   receiving, by the client library, acknowledgement of the third log from one or more of the plurality of servers; and transmitting, by the client library to the client devices, the acknowledgement of the third log entry subsequent to the acknowledgement of the second log entry.

7. The method of claim 6, wherein the authorizing, by the client library, transmission of the third log entry comprises authorizing transmission of the third log entry prior to transmission of the second log entry.

8. The method of claim 6, further comprising batching a plurality of log entries including the second log entry and the third log entry by the second client device and transmitting the second log entry and the third log entry prior to transmission of the first log entry to one or more of the plurality of servers in the network.

9. The method of claim 1, wherein the second entry identifier is a sequential increment of the first entry identifier.

10. A client device in a network that comprises a plurality of servers and a plurality of client devices, the client device comprising:
a processor; and
a memory communicably coupled to the processor, the memory including computer instructions configured to cause the processor to:
allocate a first entry identifier corresponding to a first log entry of a plurality of log entries created by a first client process of a plurality of client processes, wherein the first client process runs on a first client device of the plurality of client devices;
allocate a second entry identifier corresponding to a second log entry of the plurality of log entries created by a second client process of the plurality of client processes, wherein the second client process runs on a second client device of the plurality client devices concurrently with running of the first client process on the first client device, and wherein the second entry identifier is allocated subsequent to the first entry identifier being allocated;
authorize transmission of the first log entry by the first client device and the second log entry by the second client device to one or more of the plurality of servers in the network, wherein the authorizing comprises authorizing transmission of the second log entry prior to transmission of the first log entry;
receive acknowledgement of the first log entry and acknowledgement of the second log entry from one or more of the plurality of servers that replicate the first log entry and the second log entry in a journal that includes a background thread checkpoint, maintain a copy of the journal in cache memory, update the journal by flushing at least the first log entry and the second log entry up until a predetermined checkpoint, and delete one or more other journals older than the predetermined checkpoint; and
transmit the acknowledgement of the second log entry subsequent to the acknowledgement of the first log entry.

11. The client device of claim 10, wherein the computer instructions further comprise computer instructions to cause the processor to batch a plurality of log entries including the first log entry and the second log entry by one of the client devices.

12. The client device of claim 10, wherein the computer instructions further comprise computer instructions configured to cause the processor to:
allocate a third entry identifier corresponding to a third log entry of the plurality of log entries created by a third client process of the plurality of client processes, wherein the third client process runs on a third client device of the plurality client devices concurrently with running of the first client process on the first client device and running of the second client process on the second client device, and wherein the third entry identifier is allocated subsequent to the second entry identifier being allocated;
authorize transmission of the third log entry by the third client device to one or more of the plurality of servers in the network prior to transmission of the first log entry;
receive acknowledgement of the third log from one or more of the plurality of servers; and
transmit the acknowledgement of the third log entry subsequent to the acknowledgement of the second log entry.

13. The client device of claim 12, wherein transmission of the third log entry occurs prior to transmission of the second log entry.

14. The client device of claim 12, wherein the computer instructions further comprise computer instructions to cause the processor to batch a plurality of log entries including the second log entry and the third log entry by the second client device and transmitting the second log entry and the third log entry prior to transmission of the first log entry to one or more of the plurality of servers in the network.

15. The client device of claim 10, wherein the second entry identifier is a sequential increment of the first entry identifier.

16. A client device comprising:
a network interface;
a memory to store a client library to authorize transmission of log entries; and
a processor, communicatively coupled to the storage device and the network interface, to use the client library to allocate a first entry identifier corresponding to a first log entry created by a first client process executed by the processor, to allocate a second entry identifier corresponding to a second log entry created by a second client process executed on a different client device, wherein the second entry identifier is allocated subsequent to the first entry identifier being allocated, to authorize transmission of the second log entry prior to transmission of the first log entry via the network interface, to receive acknowledgement of the first log entry and acknowledgement of the second log entry from one or more of a plurality of servers via the network interface replicate the first log entry and the second log entry in a journal that includes a background thread checkpoint, maintain a copy of the journal in cache memory, update the journal by flushing at least the first log entry and the second log entry up until a predetermined checkpoint, and delete one or more other journals older than the predetermined checkpoint, wherein the acknowledgement of the second log entry is received subsequent to the acknowledgement of the first log entry.

17. The client device of claim 16, wherein the processor uses the client library to batch a plurality of log entries including the first log entry and the second log entry by one of the client devices.

18. The client device of claim 16, wherein the processor uses the client library to:
allocate a third entry identifier corresponding to a third log entry of the plurality of log entries created by a third client process that runs on a third client device concurrently with running of the first client process and the second client process, and wherein the third entry identifier is allocated subsequent to the second entry identifier being allocated;

authorize transmission of the third log entry by the third client device prior to transmission of the first log entry via the network interface;

receive acknowledgement of the third log via the network interface; and transmit the acknowledgement of the third log entry via the network interface subsequent to the acknowledgement of the second log entry.

19. The client device of claim 18, wherein transmission of the third log entry occurs prior to transmission of the second log entry.

20. The client device of claim 18, wherein the processor uses the client library to batch a plurality of log entries including the second log entry and the third log entry by the second client device, wherein the processor transmits, via the network interface, the second log entry and the third log entry prior to transmission of the first log entry.

21. The client device of claim 16, wherein the second entry identifier is a sequential increment of the first entry identifier.

* * * * *